(No Model.)
J. V. AUTH.
WINDOW GLASS SETTING.
No. 377,474. Patented Feb. 7, 1888.
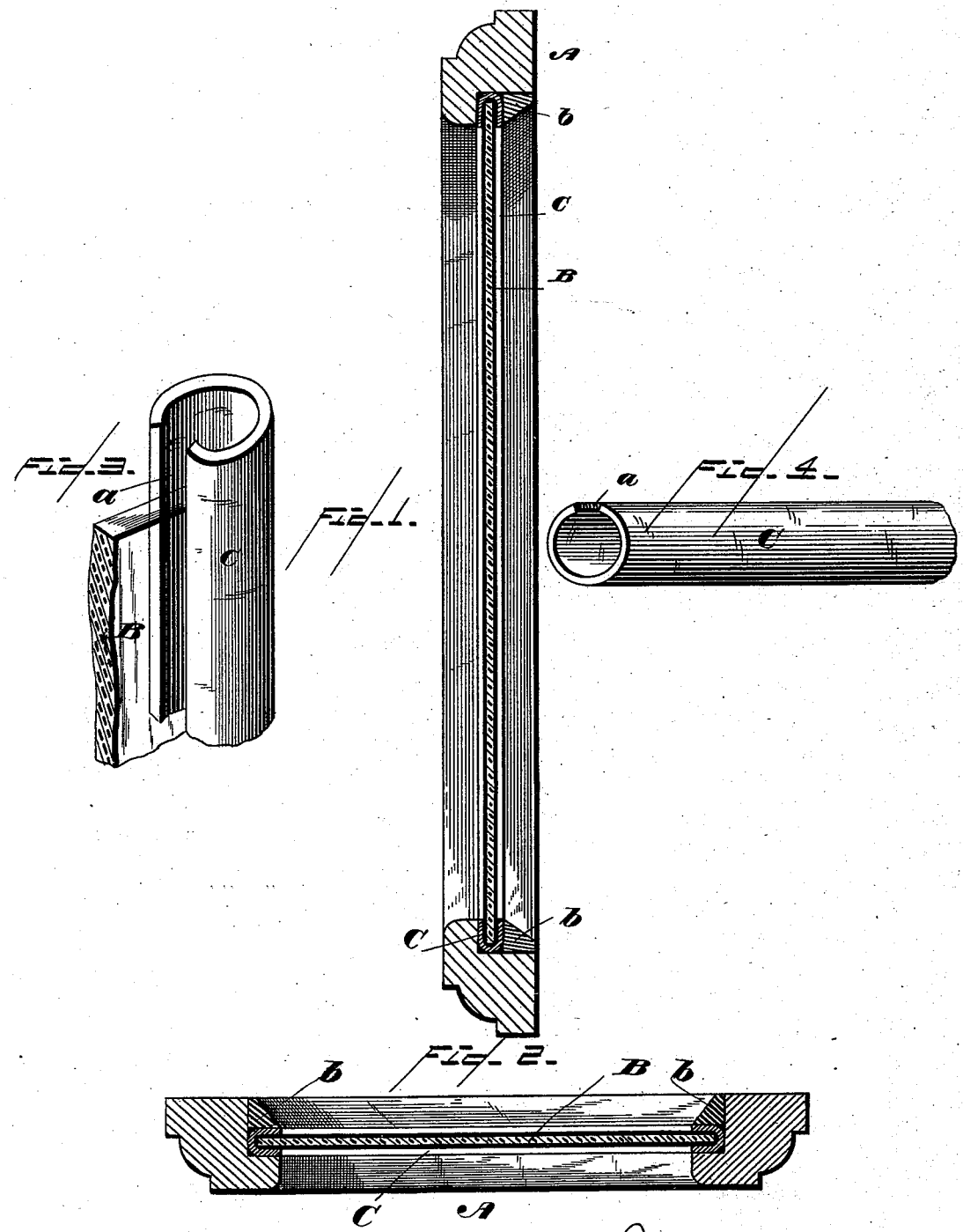
WITNESSES
INVENTOR
John V. Auth

UNITED STATES PATENT OFFICE.

JOHN V. AUTH, OF PITTSBURG, PENNSYLVANIA, ASSIGNOR OF ONE-HALF TO CONRAD AUTH, OF SAME PLACE.

WINDOW-GLASS SETTING.

SPECIFICATION forming part of Letters Patent No. 377,474, dated February 7, 1888.

Application filed August 22, 1887. Serial No. 247,610. (No model.)

*To all whom it may concern:*

Be it known that I, JOHN V. AUTH, a citizen of the United States, residing at Pittsburg, in the county of Allegheny and State of Pennsylvania, have invented certain new and useful Improvements in Window-Glass Setting; and I do hereby declare the following to be a full, clear, and exact description of the invention, such as will enable others skilled in the art to which it pertains to make and use the same, reference being had to the accompanying drawings, which form a part of this specification.

In the accompanying drawings, Figure 1 is a longitudinal sectional view of a sash with my improvements applied. Fig. 2 is a horizontal sectional view of the same. Fig. 3 is a perspective view of a portion of a glass showing my rubber cushion attached. Fig. 4 is an enlarged view of a portion of the cushion which I preferably employ.

Before describing the details of construction I wish to say that I am well aware that it is not new to place the cushion in the rabbet of a sash, which rabbet is closed by a securing-strip placed against the outer side of the glass.

The object of the present invention is to provide a cheap and simple means for permitting the expansion and contraction of glass or lights such as used in windows of houses, the same also serving as a cushion and a means of security in setting and handling the glass while placing it in the sash. The novelty consists in the construction and adaptation of parts, as will presently be set forth, and pointed out in the claim.

Referring by letter to the said drawings, A indicates a sash, which may be of any ordinary or approved construction, having a groove or rabbet to receive the glass.

B indicates a glass, which I have shown as being rectangular in outline, although it may be of other form.

C indicates the cushion, which I apply to the edge of the glass and in the groove or rabbet of the sash. This cushion I have shown as being composed of rubber tubing slitted longitudinally, as at a. This tubing, after being cut into proper length, is stretched over the edges of the glass, as more fully shown in Fig. 3. It should be here observed that this cushion, being formed from tubing, may be obtained at a very small expense, and that its resiliency will cause it to adhere to the glass before setting it in the sash and effectually serve as a protector to the hands of the workman. I attach importance to the employment of this tubing, and to the fact that it may be so quickly applied around the edges of the glass that it may adhere thereto and protect the hands of the workman. It is obvious that this tubing may be of any suitable weight, according to the size of the glass and the sash in which it is to be used. It is also obvious that if a glass should become broken or injured the tubing may be removed and placed upon another.

In operation, when the rubber has been placed over the edges of the glass, the whole may be secured in position by means of the strips b and screws or other suitable fastening devices. Should the plate of glass thus set up or placed in a window-frame expand when subjected to very high temperature, the rubber will yield, and thereby prevent serious damage to the glass; or should the building settle or the frame warp, the glass will be protected from breakage.

Having described this invention, what I claim is—

The combination of the window-sash, grooved as described, a window-glass, the rubber tubing C, slitted longitudinally and applied to the edges of the glass, and the strips b, confining the rubber and glass in the groove of the sash, substantially as specified.

JOHN V. AUTH.

Witnesses:
C. C. LEE,
M. E. HARRISON.